L. Sterne,
Driving-Belt.
Nº 93,364.        Patented Aug. 3. 1869.
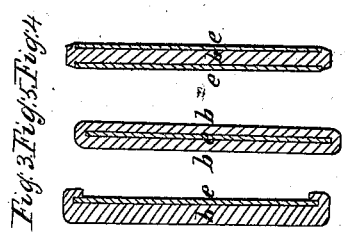
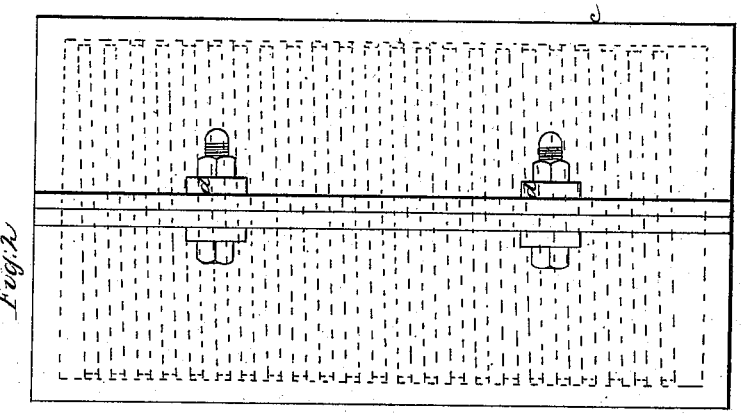
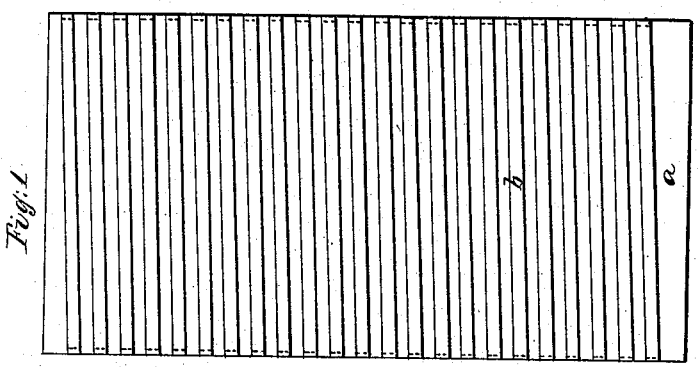
Witnesses                Inventor

United States Patent Office.

LOUIS STERNE, OF LONDON, ENGLAND.

*Letters Patent No. 93,364, dated August 3, 1869; patented in England, June 2, 1868.*

IMPROVED DRIVING-BELT AND BAND OF RUBBER AND METAL.

The Schedule referred to in these Letters Patent and making part of the same.

*To all whom it may concern:*

Be it known that I, LOUIS STERNE, a citizen of the United States, now residing in London, county of Middlesex, England, have invented a new and useful Improvement in "the Manufacture of Driving-Belts, Bands, or Straps," of which the following is a full, clear, and exact description, reference being had to the accompanying drawing, forming part of this specification, and in which—

Figure 1 represents a longitudinal view of a drum having a belt, in the early course or preparatory process of its manufacture, according to my improvement, wound upon it;

Figure 2, a similar view of the same, under enclosure of a cylinder made in sections, for carrying out a subsequent process in the manufacture of the belt; and Figures 3, 4, and 5, transverse sections of a belt, band, or strap, made in accordance with my improvement, under different modifications or forms of construction.

Similar letters of reference indicate corresponding parts.

My invention consists in manufacturing driving-belts, bands, or straps from India rubber and metal, in strips, united or joined together during the process of vulcanization or curing.

In this way I produce a driving-belt, band, or strap, possessing great strength, durability and efficiency, formed in part of a metal strip or strips, and in part of a strip or strips of rubber, united without the aid of any extraneous fastenings.

The following will serve to illustrate how this is or may be done:

Supposing, for instance, it be desired to make a belt with metal on one side only, I wind a strip or length of rubber prepared for curing or vulcanizing, and a thin strip of metal together upon a drum or cylinder, as shown in fig. 1, in which *a* is the drum, *b*, the rubber, wound spirally thereon, and faced by a strip of metal, which, being under the rubber, is not seen in this figure.

When a sufficient length of these combined rubber and metal strips has been wound on the drum, I enclose the whole within or by two half cylinders, *c c*, clamped by nuts *d d*. I then submit the band, thus supported and enclosed, to the process of vulcanization or curing, whereby the metal and rubber are firmly united.

I do not, however, limit myself to winding the strips upon a drum in order to subject them to the curing-process, as they may be placed and pressed in a mould, or placed on and pressed or supported by an expanding-drum, or be otherwise held under pressure during the curing. If the metal and rubber strips have been previously chemically prepared, they are united chemically.

When the metal strips are composed of steel or iron, their surfaces should first be ground or scoured perfectly free from scale or oxidized matter, and then be placed in a bath prepared to deposit the necessary precipitation of copper and zinc by the electro-metallurgical process, after which they may be put into sawdust to dry, and then be placed on the rubber and treated as hereinbefore described.

Belts of this description or character may either be made with a metal strip, *e*, on only one side of the rubber *b*, as represented in fig. 3, or with metal strips on both sides, as in fig. 4, or be formed of a strip of metal, *e*, interposed between two strips of rubber, *b b*, as shown in fig. 5.

It is preferred that the edges of the metal strip or strips should be embedded in the rubber, as represented in the drawing.

Outside of the belt, band or strap, made of rubber and metal combined, as described, may be a layer or layers of rubber and canvas, or other suitable material or materials. Such belts or bands may be of any desired form in their transverse section. Thus, they may be round, consisting of a central steel wire, with a covering of rubber united with the wire during vulcanization, and surrounded by an outer wrapper of rubber and canvas.

What is here claimed, and desired to be secured by Letters Patent, is—

A driving-belt, band, or strap, made of India-rubber and metal strips, united or joined together during the process of vulcanization, substantially as specified.

LOUIS STERNE.

Witnesses:
T. W. ATKINSON,
W. D. WOOD.